US006865641B2

(12) United States Patent
Dixon

(10) Patent No.: US 6,865,641 B2
(45) Date of Patent: Mar. 8, 2005

(54) METHOD AND APPARATUS FOR NON-VOLATILE DISPLAY OF INFORMATION FOR AN ELECTRONIC DEVICE

(75) Inventor: Robert Christopher Dixon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 10/232,253

(22) Filed: Aug. 29, 2002

(65) Prior Publication Data

US 2004/0041749 A1 Mar. 4, 2004

(51) Int. Cl.[7] .............................................. G06F 12/00
(52) U.S. Cl. ...................... 711/103; 359/242; 359/277; 359/293; 345/84
(58) Field of Search ..................... 711/114; 359/242, 359/277, 291, 293; 345/84

(56) References Cited

U.S. PATENT DOCUMENTS

| 5,492,268 A | 2/1996 | Biddle et al. ............... 229/67.1 |
| 5,574,898 A | 11/1996 | Leblang et al. ............. 395/601 |
| 5,903,897 A | 5/1999 | Carrier, III et al. .......... 707/203 |
| 6,016,107 A | 1/2000 | Kampe et al. .......... 340/825.44 |
| 6,101,506 A | 8/2000 | Ukai et al. ................... 707/203 |
| 6,272,678 B1 | 8/2001 | Imachi et al. .................. 717/11 |
| 6,345,385 B2 | 2/2002 | Imamura et al. .............. 717/11 |
| 6,349,203 B1 | 2/2002 | Asaoka et al. ............... 455/414 |
| 6,360,255 B1 * | 3/2002 | McCormack et al. ........ 709/221 |
| 6,680,792 B2 * | 1/2004 | Miles .......................... 359/291 |
| 2002/0167500 A1 * | 11/2002 | Gelbman |
| 2003/0002126 A1 * | 1/2003 | Doron ......................... 359/242 |
| 2003/0145496 A1 * | 8/2003 | Oross et al. |
| 2003/0156100 A1 * | 8/2003 | Gettemy ..................... 345/204 |

FOREIGN PATENT DOCUMENTS

| JP | 2159162 | 6/1990 | ............. G06F/9/06 |
| JP | 11226228 | 8/1999 | ............. A63F/7/02 |
| JP | 2001014149 | 1/2001 | ............. G06F/9/06 |

* cited by examiner

*Primary Examiner*—Donald Sparks
(74) *Attorney, Agent, or Firm*—Anthony V S England; Robert M. Carwell

(57) ABSTRACT

In one form of the invention, an apparatus for visually displaying a non-volatile message includes an integrated circuit having first circuitry. The apparatus also includes a package for the integrated circuit and a display affixed to the integrated circuit package. The first circuitry is coupled to the display and operable to be coupled to an electronic device by pins of the integrated circuit package and to write a non-volatile, visual image via the display responsive to receiving a message from the electronic device.

22 Claims, 4 Drawing Sheets

METHOD AND APPARATUS FOR NON-VOLATILE DISPLAY OF INFORMATION FOR AN ELECTRONIC DEVICE

BACKGROUND

1. Field of the Invention

This invention concerns displaying information for an electronic device, and in particular to visually displaying information in a non-volatile manner.

2. Related Art

It is common to put a label on an electronic device to indicate information about the device such as the level, i.e., version, of software loaded on it, or some other version information. It is common to encounter a mismatch between the information on the label and the actual state of the device such as due to the software being updated without the label being updated. This is not problematic where the device is capable of automatically updating a display provided for the information, e.g., via an LED display or other the like. In many cases, though, the device may have no automatically display mechanism. This is particularly true since electronic devices are increasingly produced so cheaply as to be disposable, and therefore are provided with a bare minimum of user and service interfaces, including displays. Recently a disposable cell phone was announced, for example. Even these extremely inexpensive devices, however, maybe capable of user updating. For example, new drivers or operating system updates may be downloaded by the user via the Internet. For these reasons and others, there is a need for an inexpensive, updateable display mechanism.

SUMMARY

The foregoing need is addressed in the present invention. According to one form of the invention, an apparatus for visually displaying a non-volatile message includes an integrated circuit having first circuitry. The apparatus also includes a package for the integrated circuit and a display affixed to the integrated circuit package. The first circuitry is coupled to the display and operable to be coupled to an electronic device by pins of the integrated circuit package and to write a non-volatile, visual image via the display responsive to receiving a message from the electronic device.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
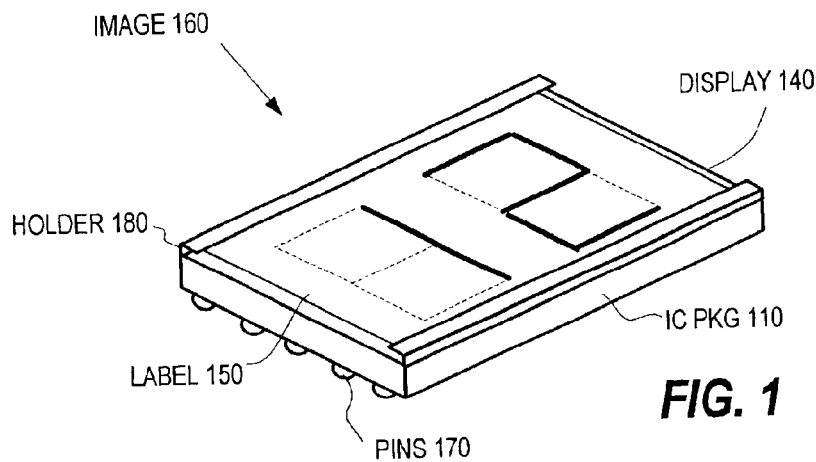
FIG. 1 illustrates an apparatus for visually displaying a non-volatile message for an electronic device, according to an embodiment of the present invention.

Referring now to FIG. 1, an apparatus is shown for visually displaying a non-volatile message for electronic device, according to an embodiment of the present invention. The apparatus includes an integrated circuit (not shown in FIG. 1) in an integrated circuit package 110. A display 140 is affixed to the top surface of the package 110. First circuitry (not shown in FIG. 1) of the integrated circuit ("IC") is electrically coupled to the display 140 so that the display 140 and the first circuitry can communicate. The first circuitry is also coupled to pins 170, which, in this particular embodiment, are of the solder-ball grid array type. In general, the pins 170 are to mechanically affix the package 110 and electrically couple the IC, including first circuitry, to an external electronic device (not shown in FIG. 1), so that the device and the first circuitry can communicate and information for the device can be displayed on display 140.

The apparatus includes a holder 180, as shown, for holding a label 150 in close proximity to the display 140, so that the display 140 can "burn" an image 160 in the label 150. That is, the label 150 in the illustrated embodiment includes thermal-sensitive paper and the display 140 has elements for selectively heating the paper in such a way as to produce an image 160.

Figure 2A:
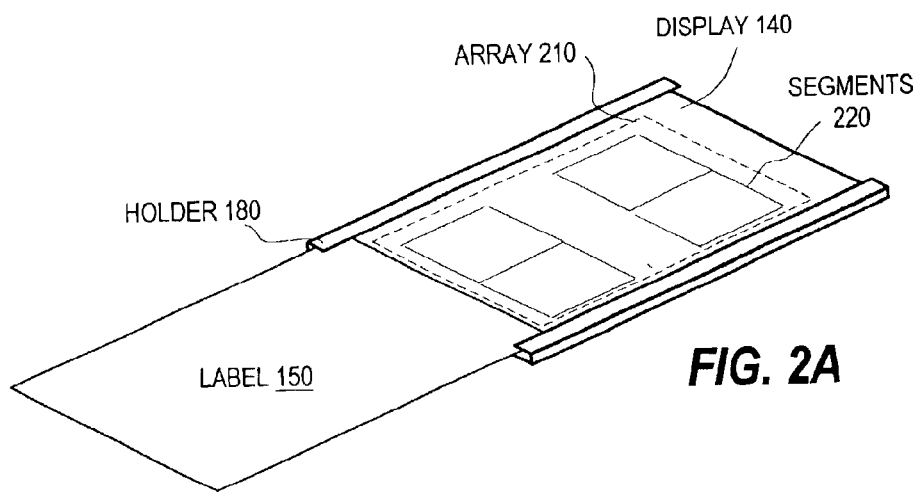
FIGS. 2A and 2B illustrate further details of the display of the apparatus FIG. 1, according to an embodiment.
Figure 2B:
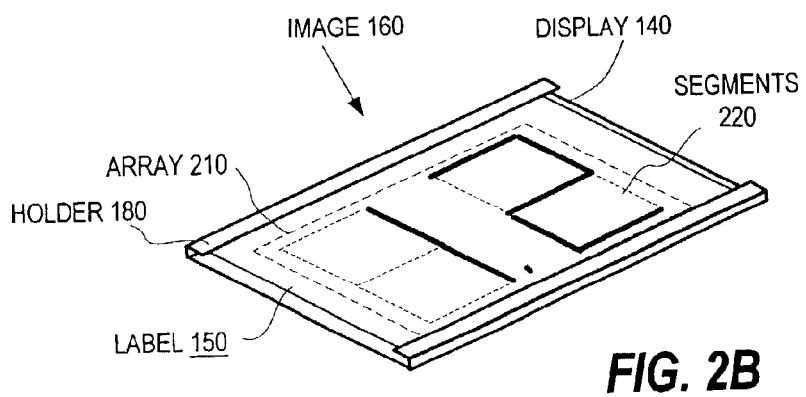

Referring now to FIGS. 2A and 2B, details are shown of the display 140. (Herein, elements shown in more than one figure are generally numbered consistently throughout.) In particular, details are shown which relate to the creation of an image 160 for label 150. FIG. 2A shows the display 140 as the label 150 is being inserted into the holder 180. Consequently, in the view of FIG. 2A additional features of the display 140 are exposed, including array 210, which has numerous segments 220. In the embodiment illustrated, the array 210 has two sets of seven segments 220 arranged in the manner of a conventional seven segment indicator, with a single "dot" segment 220 there between. Each of the segments 220 can be selectively caused to heat by the first circuitry writing to them.

FIG. 2B shows the display 140 with the label 150 fully inserted into the holder 180 so that the label 150 is held against, or at least very close to the array 210. In the illustrated instance, certain ones of the segments 220 have been heated, causing the image 160 of the number "1.2" to be "burned" in the label 150.

It should be understood that the term "burn" is used herein not in the literal sense of combustion, but to refer to the process by which the array 210 segments 220 cause a change in appearance in the label 150. Moreover, in other embodiments, this process does not necessarily involve heat at all. In one such other embodiment, the label 150 is transparent or at least translucent and a message is printed on the label 150 by ink selectively deposited or displaced on the side of the label facing the array 210 from the action of an electrical current or electrostatic field controlled by the array 210. In another, regions of the label 150 are essentially permanently magnetized by an electrical field or current controlled by the array 210 and a ferrous dust on the label 150 is selectively deposited or displaced to form the printed message. Also, in other embodiments the segments 220 themselves permanently change appearance responsive to writing by the first circuitry, so that the label 150 is not required at all. Accordingly, in another embodiment, the array 210 includes a media that changes appearance responsive to an electrical action and retains that changed appearance even after electrical power is removed. An advantage of the embodiment illustrated in FIG. 2B, which includes the label 150, is that the label 150 can be replaced with a new label 150 after an image 160 has been burned in the original label 150. In this manner the display 140 can write images 160 essentially without limit.

It is advantageous that the image 160 burned in the label 140 is essentially permanent, and therefore remains for viewing regardless of whether power is applied to the first circuitry or the display 140. (Likewise, for the previously mentioned embodiment in which a label 150 is not used and the segments 220 themselves change appearance responsive to the writing, once they have been written the segments 220 change appearance permanently.)

Even though segments 220 are permanently changed when written, it should be understood that the image 160 can still be changed numerous times by successively writing different segments 220. For example, the "1.2" image shown in FIG. 2B could subsequently be changed to "1.8" or "0.2" or "0.6," etc.

Figure 3:
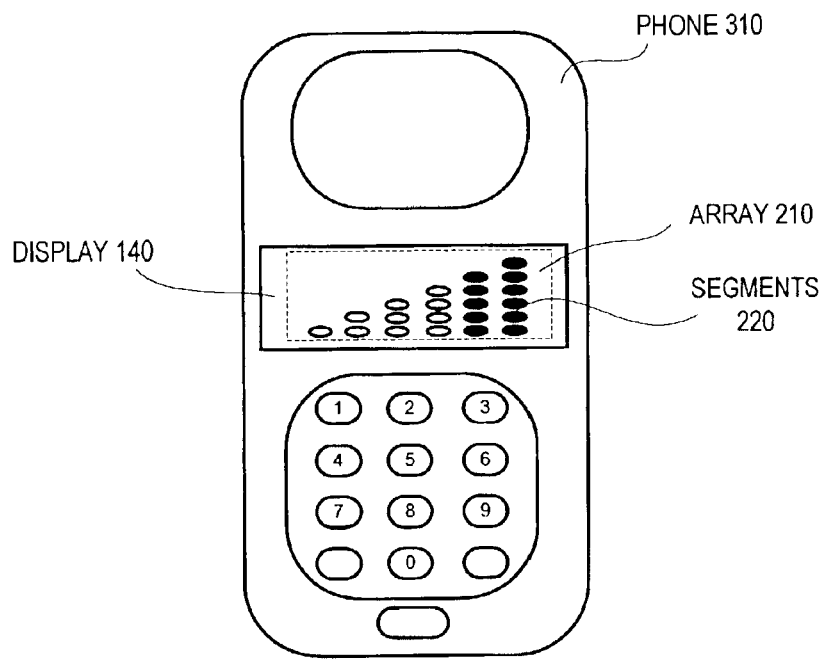
FIG. 3 illustrates an application in which the apparatus of the present invention is affixed to a disposable cell phone so the display of the apparatus is easily viewable, according to an embodiment.

Referring now to FIG. 3, an application is shown in which the apparatus is affixed to a disposable cell phone 310 so the display 140 is easily viewable. In this embodiment, the segments 220 of the array 210 are arranged differently, i.e., not in the manner of a seven segment indicator. Specifically, the segments 220 are arranged as a series of six stacks of dots, with the number of dots in each stack increasing from left to right. This arrangement is useful for displaying the amount of calling time remaining on the phone 310. That is, as the time is used up, the stacks of segments 220 are successively written from right to left. In the instance illustrated, ⁴⁄₆ of the paid-up calling time remains, as indicated by the four smallest (leftmost) of the six stacks being unwritten (and, conversely, the two rightmost stacks being written).

It should be appreciated that in other embodiments the arrangement or interpretation of segments are different than that shown in and described in connection with FIG. 3. For example, in one embodiment the stacks get progressively smaller from left to right instead of right to left. Or, for example, in another embodiment remaining time is indicated by larger unwritten stacks instead of smaller ones. Of course, in one embodiment there is just a single stack of dots instead of a series of stacks. In another embodiment array elements form the shape of a clock face or an hour glass, and the elements are progressively written to fill the shape.

Of course, in other embodiments the display 140 of the present apparatus is used for electronic devices other than disposable cell phone 310. In some other embodiments the apparatus is used, as in the application described above, for displaying an amount of a consumable resource remaining for the associated electronic device. In one embodiment the display 140 is used with a disposable camera to indicate the number of an exposed photographs remaining.

In another embodiment the display 140 is used for an electronic device that has battery operated circuitry to indicate the amount of battery life remaining. (The cell phone 310 of FIG. 3 may be operated by batteries, and may therefore have a second display 140, in addition to the one shown in FIG. 3, to indicate remaining battery life. Likewise, the disposable camera mentioned above could have two displays, one for indicating remaining photographs and another for remaining battery life. Of course in other applications there may be even more than two displays 140 for an electronic device.)

In one embodiment the display 140 is not merely used in association with a battery to indicate battery life remaining, but the display 140 and circuitry to drive the display 140 are affixed to the battery, so that the display 140 automatically displays the remaining battery life or some similar measure of health of the battery without requiring any user action. Contrast this to one conventional mechanism in which the user presses little dots on the side of a battery to generate an indication of the health of the battery. In one embodiment, the array 210 writes to elements that collectively form an icon in the shape of the battery when the battery is used up.

In other embodiments, the apparatus is used for purposes other than displaying an amount of a consumable resource remaining for the associated electronic device. In one such embodiment the apparatus is affixed to a printed circuit board for displaying information about one or more of the electronic devices of the board. In this embodiment the apparatus is particularly useful for (but not limited to) displaying information about a version of the printed circuit board, or a version of software loaded on one or more of the devices of the board. In one application, this version information is communicated to the apparatus when the board is powered up or down. In this embodiment the apparatus is also very useful for (but not limited to) displaying diagnostic information about on one or more of the devices of the board. In one application, if a device is failing in communicates a code to be displayed by the apparatus which indicates something about the cause of the failure, time of failure, or what operation or line of code was being executed at the time when the failure occurred, etc.

Figure 4:
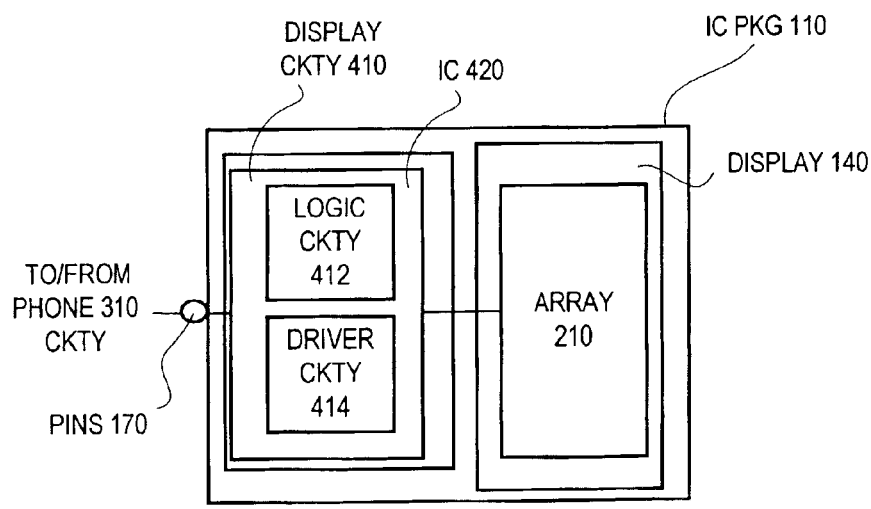
FIG. 4 illustrates, in a block diagram format, details of the embodiments shown in the above FIGS. 1, 2A, 2B and 3.

Referring now to FIG. 4, details of the apparatus described in the preceding FIG's are shown in a block diagram format, according to an embodiment of the present invention. The display 140, including array 210, is affixed to integrated circuit package 110 and electrically connected to display circuitry 410 of an integrated circuit 420. The display circuitry 410 includes driver circuitry 414, for driving, i.e., writing, the segments (not shown) of array 210. The driver circuitry 414 communicates with logic circuitry 412 of the display circuitry 410, which, in turn, is electrically coupled by means of pins 170 to circuitry of the phone 310 (FIG. 3) for communicating with the phone 310 circuitry to determine remaining calling time.

Figure 5:
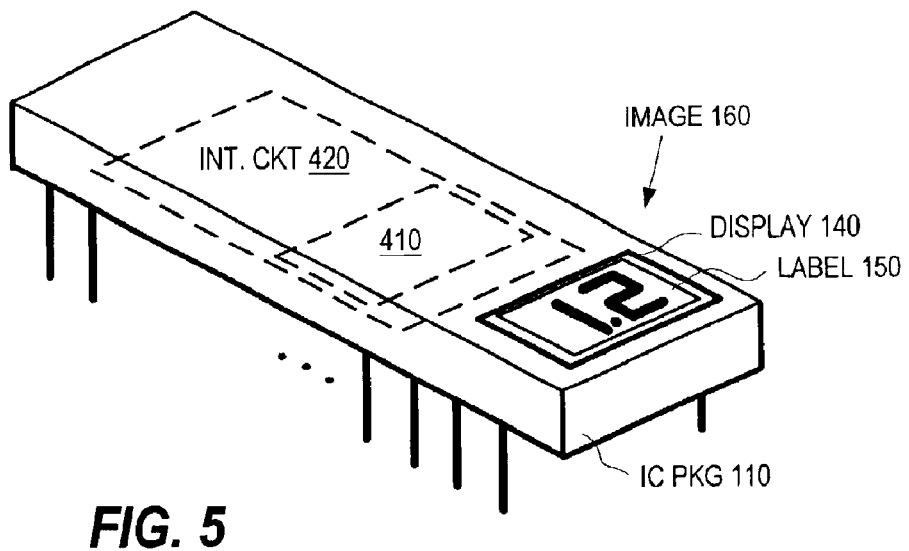
FIG. 5 illustrates another embodiment of the apparatus.

Referring now to FIG. 5, another embodiment of the apparatus is illustrated. In this embodiment the display circuitry 410 is part of an integrated circuit 420 contained in integrated circuit package 110, and the electronic device for which information is displayed on display 140 is the integrated circuit 420 itself. That is, the display 140 burns an image 160 in label 150 which conveys information about the integrated circuit 420. In this embodiment the apparatus is particularly useful for (but not limited to) an application similar to the previously mentioned application, in which information is displayed by the display 140 about a version of the integrated circuit 420, or a version of software loaded on the IC 420. In one application, this version information is communicated to the apparatus when the IC 420 is powered up or down. In this embodiment the apparatus is also very useful (but not limited to) displaying diagnostic information about the IC 420. In similar fashion to the previously mentioned printed circuit board application, in one application of the IC 420 embodiment of the present invention if the IC 420 is failing it communicates a code to be displayed by the apparatus which indicates something about the cause of the failure, time of failure, or what operation or line of code was being executed at the time when the failure occurred, etc.

Figure 6:
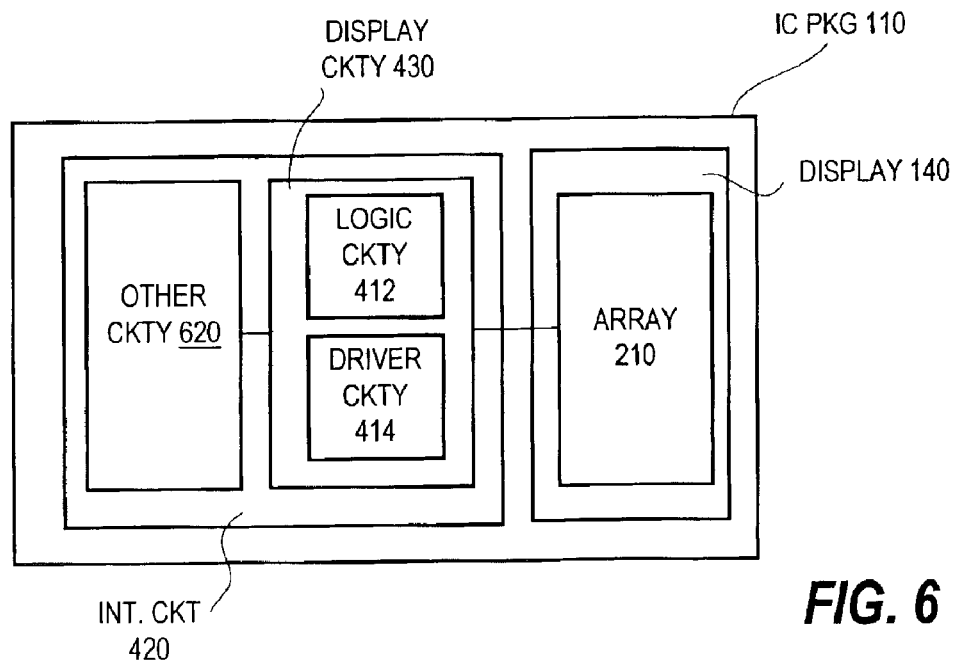
FIG. 6 illustrates details, in a block diagram format, of the apparatus shown in FIG. 5, according to an embodiment of the present invention.

Referring now to FIG. 6, details of the apparatus described in FIG. 5 are shown in a block diagram format, according to an embodiment of the present invention. The display 140, including array 210, is affixed to the integrated circuit package 110 and electrically connected to display circuitry 410 of the integrated circuit 420. The display circuitry 410 is part of a larger IC 420, and includes driver circuitry 414, for driving, i.e., writing, the segments (not shown) of array 210. The driver circuitry 414 communicates with logic circuitry 412 of the display circuitry 410, which, in turn, is electrically coupled to other circuitry 620 of the IC 420 for communicating with the IC 420.

In another embodiment similar to that which is shown in FIGS. 5 and 6, the integrated circuit package 110 is a multi-chip module, in which case the circuitry 410 may be on a different die, i.e., a separate IC, than that of circuitry 620, but with both integrated circuits included in the same package 110.

Figure 7:
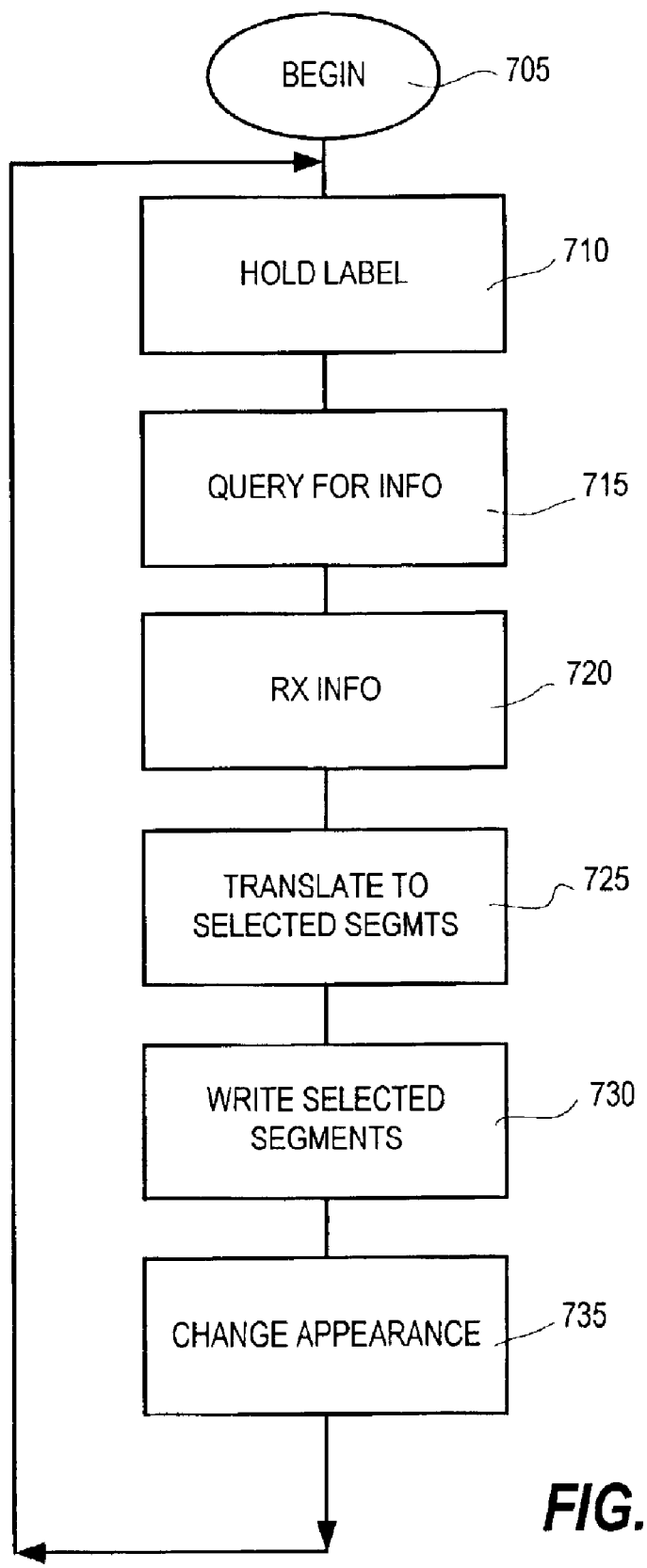
FIG. 7 illustrates, in a flow chart, aspects of an algorithm for performing functions relating to the above FIG's, according to an embodiment of the present invention.

Referring now to FIG. 7, aspects of an algorithm for performing functions described herein above are illustrated in a flow chart, according to an embodiment of the present invention. The algorithm 700 begins at 705. Then, at 710, a label is held against the array of the display. Next, at 715 display circuitry of the apparatus of the present invention queries the electronic device to which the apparatus is being applied. This may be in response to an event in the electronic device that is detected by the display circuitry of the apparatus, that is, and event such as has been previously described including power up, power down or some sort of failure. Examples of failures include a computational error caused either by hardware failure or software, such as a page fault, overflow, mis-computation detected by error checking, etc., a hardware failure unrelated to computation, etc. Then, at 720, the display circuitry of the apparatus receives information from the electronic device. This information may be in the form of a message according to a standard protocol, such as a standard serial bus protocol. Next, at 725, logic circuitry of the display circuitry translates the message in order to select segments of the array of the apparatus. At 730 the selected segments are communicated to the driver by the logic circuitry, and the driver writes, i.e., drives, the selected segments. Consequently, at 735 the selected, driven segments heat up, causing the corresponding portion of the label to change appearance permanently. The algorithm 700 then continues back to block 715 to query again.

In addition to the advantages which have already been described above, it should be appreciated that invention is also advantageous for the following reasons, among others. A service technician may need to determine information about an electronic device, such as a printed circuit board, appliance, etc. without power being applied to the device. For example, a device may have been updated by a consumer who downloaded software for the device from the Internet. The present invention may be applied to automatically write an indication of the updated software version on a display for the device in a nonvolatile manner. Then a technician may be directed to the device to perform some service on it. Ordinarily, conventional displays require power. However, according to the present invention power is not needed, since the indication has been permanently written on a label removably affixed to the display of the apparatus, or, alternatively has been permanently written by changing the appearance of segments on an array of the display.

Also, a manufacturer may advantageously apply the invention so that the fewer labels have to be kept in stock for manufactured products. Instead of having to provide custom labels for each individual product or product line, the manufacturer can have each product print its own label, at least in part. That is, portions of product labels may be pre-printed before the labels are applied to the products, and then each product can print an additional portion of its own label. This application extends also to serial numbers. That is, instead of a manufacturer assigning a large block of numbers to a manufacturing operation or location, serial numbers can be assigned more nearly instantaneously and on a more individual basis., much like airline seats are reserved, with the products printing their own labels.

As another example, according to the invention the device may have sent information to the display in connection with a failure. The failure may even prevent the device, at least temporarily, from responding to power when a technician attempts to fix it. Ordinarily this might even prevent the display of the information about the device, but according to the present invention the information remains visible on the display of the apparatus of the present invention even without power.

The description of the present embodiment has been presented for purposes of illustration, but is not intended to be exhaustive or to limit the invention to the form disclosed. Many modifications and variations will be apparent to those of ordinary skill in the art. For example, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such as a floppy disk, a hard disk drive, a ROM, and CD-ROM, and transmission-type media such as digital and analog communications links, e.g., the Internet.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. An apparatus for visually displaying a non-volatile message for an electronic device, wherein the apparatus comprises:

an integrated circuit having first circuitry;

a package for the integrated circuit; and a display affixed to the integrated circuit package, wherein the first circuitry is coupled to the display and operable to be coupled to the electronic device by pins of the integrated circuit package and to write a non-volatile, visual image via the display responsive to receiving a message from the electronic device, wherein the display comprises an array having a number of segments, and writing the non-volatile, visual image comprises the first circuitry selectively driving at least one segment of the array, and wherein a thermally-sensitive label is held proximate to the at least one segment and the at least one segment generates heat responsive to the driving, the heat being effective for permanently changing an appearance of a portion of the label corresponding to the at least one segment.

2. The apparatus of claim 1, wherein the first circuitry comprises logic circuitry operable, responsive to the electronic device powering up, to automatically determine a version for the electronic device and write an indication of the version via the display.

3. The apparatus of claim 1, wherein the first circuitry comprises logic circuitry operable to determine an amount of a consumable resource remaining for the electronic device and write an indication of the remaining amount via the display.

4. The apparatus of claim 3, wherein the electronic device comprises battery operated circuitry, and the consumable resource comprises battery operating time.

5. The apparatus of claim 3, wherein the electronic device comprises a disposable cell phone and the consumable resource comprises calling time.

6. An apparatus for visually displaying a non-volatile message for an electronic device, wherein the apparatus comprises:
   a display affixed to the electronic device; and
   first circuitry affixed to the electronic device and communicatively coupled to the electronic device and the display, the first circuitry being operable to write a non-volatile, visual image via the display responsive to receiving a message from the electronic device, wherein the display comprises an array having a number of segments, and writing the non-volatile, visual image comprises the first circuitry selectively driving at least one segment of the array, and wherein a thermally-sensitive label is held proximate to the at least one segment and the at least one segment generates heat responsive to the driving, the heat being effective for permanently changing an appearance of a portion of the label corresponding to the at least one segment.

7. The apparatus of claim 6, wherein the electronic device comprises a packaged integrated circuit, the display being affixed to the package.

8. The apparatus of claim 6, wherein the electronic device comprises a printed circuit board to which the display is affixed.

9. The apparatus of claim 6, wherein the first circuitry comprises logic circuitry operable, responsive to the electronic device powering up, to automatically determine a version for the electronic device and write an indication of the version via the display.

10. The apparatus of claim 6, wherein the first circuitry comprises logic circuitry operable to determine an amount of a consumable resource remaining for the device and write an indication of the remaining amount via the display.

11. The apparatus of claim 10, wherein the electronic device comprises battery operated circuitry, and the consumable resource comprises battery operating time.

12. The apparatus of claim 10, wherein the electronic device comprises a disposable cell phone and the consumable resource comprises calling time.

13. A method for visually displaying a non-volatile message for an electronic device, the method comprising the steps of:
   receiving a message from the electronic device by first circuitry affixed to the device;
   writing, responsive to the message, a non-volatile, visual image by the first circuitry via a display affixed to the device, wherein the display comprises an array having a number of segments, and writing the non-volatile, visual image comprises the first circuitry selectively driving at least one segment of the array, and the method includes the step of holding a thermally-sensitive label proximate to the at least one segment, and wherein the at least one segment generates heat responsive to the driving and permanently changes an appearance of a portion of the label corresponding to the at least one segment.

14. The method of claim 13, wherein the electronic device comprises a packaged integrated circuit, the display being affixed to the package.

15. The method of claim 13, wherein the electronic device comprises a printed circuit board to which the display is affixed.

16. The method of claim 13, wherein the first circuitry comprises logic circuitry and the method comprises:
   automatically determining, by the logic circuitry in response to the electronic device powering up, a version for the electronic device; and
   writing an indication of the version via the display by the logic circuitry.

17. The method of claim 13, wherein first circuitry comprises logic circuitry and the method comprises:
   determining, by the logic circuitry, an amount of a consumable resource remaining for the device; and
   writing via the display, by the logic circuitry, an indication of the remaining amount.

18. The method of claim 17, wherein the electronic device comprises battery operated circuitry, and the consumable resource comprises battery operating time.

19. The method of claim 17, wherein the electronic device comprises a disposable cell phone and the consumable resource comprises calling time.

20. An apparatus for visually displaying a non-volatile message for an electronic device, wherein the apparatus comprises:
   a display affixed to the electronic device; and
   first circuitry affixed to the electronic device and communicatively coupled to the electronic device and the display, the first circuitry being operable to write a non-volatile, visual image via the display responsive to receiving a message from the electronic device, wherein the display comprises an array having a number of segments, and writing the non-volatile, visual image comprises the first circuitry selectively driving at least one segment of the array, wherein a thermally-sensitive label is held proximate to the at least one segment and the at least one segment generates heat responsive to the driving, the heat being effective for permanently changing an appearance of a portion of the label corresponding to the at least one segment.

21. The apparatus of claim 20, wherein the first circuitry comprises logic circuitry operable, responsive to the electronic device powering up, to automatically determine a version for the electronic device and write an indication of the version via the display.

22. The apparatus of claim 20, wherein the first circuitry comprises logic circuitry operable to determine an amount of a consumable resource remaining for the device and write an indication of the remaining amount via the display.

* * * * *